United States Patent [19]

Austin

[11] Patent Number: 5,578,256
[45] Date of Patent: Nov. 26, 1996

[54] CONTROL OF INJECTION MOULDING MACHINE

[75] Inventor: Colin Austin, Kilsyth, Australia

[73] Assignee: Moldflow Pty, Ltd, Victoria, Australia

[21] Appl. No.: 927,317

[22] PCT Filed: Mar. 23, 1991

[86] PCT No.: PCT/AU91/00117

§ 371 Date: Sep. 20, 1993

§ 102(e) Date: Sep. 20, 1993

[87] PCT Pub. No.: WO91/14562

PCT Pub. Date: Oct. 3, 1991

[30] Foreign Application Priority Data

Mar. 28, 1990 [AU] Australia .................... PJ9350

[51] Int. Cl.$^6$ .................................................. B29C 45/77
[52] U.S. Cl. .................... 264/40.1; 264/40.5; 264/328.1; 425/145
[58] Field of Search ................... 264/40.1, 40.5, 264/328.1; 425/145, 146, 147, 148, 149

[56] References Cited

U.S. PATENT DOCUMENTS

| | | | |
|---|---|---|---|
| 3,695,800 | 10/1972 | Hutchinson et al. | 425/146 |
| 3,859,400 | 1/1975 | Ma | 264/40.1 |
| 3,924,840 | 12/1975 | Nelson, Jr. | |
| 4,135,873 | 1/1979 | Sone et al. | 425/147 |
| 4,146,601 | 3/1979 | Bishop | 264/40.1 |
| 4,325,896 | 4/1982 | Rodgers, Jr. | 264/40.1 |
| 5,062,785 | 11/1991 | Stroud, III et al. | 425/145 |

FOREIGN PATENT DOCUMENTS

| | | |
|---|---|---|
| 435562 | 1/1972 | Australia . |
| 456761 | 11/1972 | Australia . |
| 64515/74 | 7/1975 | Australia . |
| 63-82723 | 4/1988 | Japan . |

*Primary Examiner*—Jill L. Heitbrink
*Attorney, Agent, or Firm*—Workman Nydegger Seeley

[57] ABSTRACT

An optimizing injection moulding machine. The injection moulding machine produces articles in discrete shots. For each shot the gradient or time rate of change of an actual plastic flow characteristic is measured by a sensor mounted in the nozzle of the machine and provided to a data processing device. The gradient of a reference plastic flow characteristic is also provided to the data processing device. A comparison is made between the gradient of the reference plastic flow characteristic and the gradient of the measured plastic flow characteristic from an immediately preceding shot to derive a compensated ram displacement characteristic which is inputted to a process controller. A further shot is performed, and the process repeated with the subsequent measured plastic flow characteristic until a time that an optimized ram displacement characteristic is obtained, thereby improving article part quality and saving on materials and fabrication time.

10 Claims, 7 Drawing Sheets

CONTROL OF INJECTION MOULDING MACHINE

TECHNICAL FIELD

The present invention relates to injection moulding of plastics, and relates particularly to a system and method for optimising operation of an injection moulding machine.

DESCRIPTION OF THE PRIOR ART

An injection moulding machine typically has a barrel and ram arrangement which must force a plastic melt into a die or mould through a nozzle to the runner and gate system by displacement of the ram, so to produce a particular article.

The procedure of moulding an item from a die involves three basic steps. These are the filling phase, during which the plastic flows into the cavity of the die, the pressurisation phase and finally the compensation phase. The pressurisation phase accounts for the compressibility of the plastic in its molten state, while the compensation phase accounts for the volumetric change in the transition between a molten and solid state of the plastic.

Design criteria of the injection moulding process often require that the time available to inject the plastic melt is very short, perhaps fractions of a second, which necessitates the need for close control over the ram of the injection moulding machine. Further, during the filling phase, the ram is required to move at high speed to obtain the required plastic flow velocity, whereas, during the pressurisation phase, the ram must move slowly to obtain the required plastic pressure. During the transition between the filling and pressurisation phases excessive pressure spikes can occur, which can cause significant difficulties affecting the moulding quality.

In this specification, the moulding of a single item is referred to as a shot. A single shot entails the execution of a number of sequenced steps constituting the moulding process, and which are repeated for each individual shot. One or more individual articles can be produced from the one shot.

Designers of conventional injection moulding machines have used sophisticated process controllers to regulate the speed or displacement of the ram of the machine according to a profile or characteristic which has been inputted to the process controller. This technique most often relies on the operator of the machine having to correct the ram input characteristic in accordance with a trial and error process. By such a technique one moulding is made, inspected, then appropriate or best-guess changes made based on that observation. Such a practice is cumbersome and wasteful of both time and materials.

Conventional techniques have been developed largely around control of the ram and all rely on the design variable (which is often guessed) being a property of the ram dynamics rather than considering the behaviour of the plastic melt itself. Therein lies one particular disadvantage with the prior art, in that the actual position of the plastic flow front as it enters a die is unknown. Therefore, in areas where slow injection ram speed is required (such as the gate region), the length of slow speed operation must be made long in order to ensure correct moulding. This can result in the plastic loosing temperature with a subsequent increase in the residual stresses within the article being moulded, even to the extent that the mould may not be completely filled.

The present applicant has developed computer design programs which simulate and optimize the injection moulding cavity, runner and gate design, as well as the flow of plastics into the mould. These programs are sold in many countries, and are identified by the trade marks: MOLDFLOW/FLOW or MF/FLOW.

The programs take into consideration the rheological, thermal and physical properties (such as pressure-volume-temperature relation and compressibility) of the plastic materials. The design procedure has recourse to the filling pattern of the plastic as it flows into a cavity as a function of temperature, pressure, shear rate, stress and other relevant factors to the process of injection moulding. The design programs therefore predict optimized moulding conditions in terms of melt and mould temperature, and the filling speed of the cavity. In particular these programs can be used to predict an optimized or reference flow characteristic for injection of the plastic at any point within a mould cavity as a function of time or ram displacement.

The flow characteristic is to be understood as being the progress of a plastic into a die as a function of time, or alternatively, on a displacement contour basis throughout the die. The characteristic can be either on the basis of the actual progress of the flow front through the die, or the required plastic flow pressure at a static point in the die, such as at the gate.

Even with the use of the present applicant's design software, which most accurately allows for correct mould cavity runner and gate design as well as melt and mould temperature and the reference plastic flow characteristic, conventional injection moulding machines still require continuous adjustment to correct for variations in the moulding conditions.

OBJECTS AND DISCLOSURE OF THE INVENTION

It is an object of the present invention to provide a system and method for operating such a system wherein an injection moulding machine can be optimised so as to produce articles which approach with required design criteria, quality or moulding time.

Therefore, the invention provides a method for optimising operation of an injection moudling machine for the production of moulded plastic articles, the machine having data processing means for providing said optimisation, the method comprising the steps of:

inputting to the data processing means a reference plastic flow characteristic for the article or articles to be moulded;

comparing by the data processing means the said reference characteristic with a measured actual characteristic from an immediately preceding shot to obtain an adjustment value;

compensating the injection moulding machine in accordance with the adjustment value; and performing a shot.

The invention also provides a method for optimizing operation of an injection moulding machine for production of moulded plastic articles, the machine having a ram for forcing molten plastic material from a reservoir into a die, the method comprising the steps of:

inputting to data processing means a reference plastic flow characteristic for the article or articles to be moulded;

deriving by the data processing means a ram displacement characteristic from the said reference characteristic;

performing a shot;

measuring by sensor means an actual plastic flow characteristic from one or more proceeding shots;

comparing by the data processing means the said reference characteristic with the said actual characteristics from proceeding shots to generate an error function; and deriving by the data processing means a compensated ram displacement characteristic from the error function for the next shot.

The invention further provides a method for optimizing operation of an injection moulding machine for production of moulded plastic articles, the machine having a ram for forcing molten plastic material from a reservoir into a die, the method comprising the steps of:

inputting to data processing means a reference plastic flow characteristic for the article or articles to be moulded;

comparing by the data processing means the said reference characteristic with an actual plastic flow characteristic from an immediately preceding shot as measured by sensor means;

generating by the data processing means a compensated plastic flow characteristic for the next shot on the basis of the comparison;

deriving by the data processing means a ram displacement characteristic from the said compensated characteristic; and performing a shot.

The invention further provides an injection moulding machine for production of moulded plastic articles, the machine having a ram for forcing molten plastic material from a reservoir into a die and the ram being under control of control means, the injection moulding machine further comprising:

sensor means for measuring the actual plastic flow characteristic from any one shot; and data processing means having inputted at least the said actual characteristic and a reference characteristic for the article or articles to be moulded and, in operation, comparing the said actual characteristic from the immediately preceding shot with the said reference to generate an error function; deriving a ram displacement characteristic from the said reference characteristic, compensating the said ram displacement characteristic by the error function to produce a compensated ram displacement characteristic and providing said compensated ram displacement characteristic to the control means for use in a subsequent shot.

The invention further provides an injection moulding machine for production of moulded plastic articles, the machine having a ram for forcing molten plastic material from a reservoir into a die and the ram being under control of control means, the injection moulding machine further comprising:

sensor means for measuring the actual plastic flow characteristic from any one shot; and data processing means having inputted at least the said actual characteristic and a reference characteristic for the article or articles to be moulded and, in operation, comparing the said actual characteristic from the immediately preceding shot with the said reference characteristic to generate a compensated plastic flow characteristic, deriving a new ram displacement characteristic from the said compensated characteristic and providing said new ram displacement characteristic to the control means for use in a subsequent shot.

BRIEF DESCRIPTION OF THE DRAWINGS

In order that the invention can be more clearly explained, embodiments will be described with reference to the accompanying drawings, in which.

DESCRIPTION OF PREFERRED EMBODIMENTS

A system constructed in accordance with the invention operates upon the prediction of the plastic flow progress in a die during the moulding process, and automatically regulates production of moulded articles taking into account system dynamics, and particularly has control over ram velocity.

Figure 1:
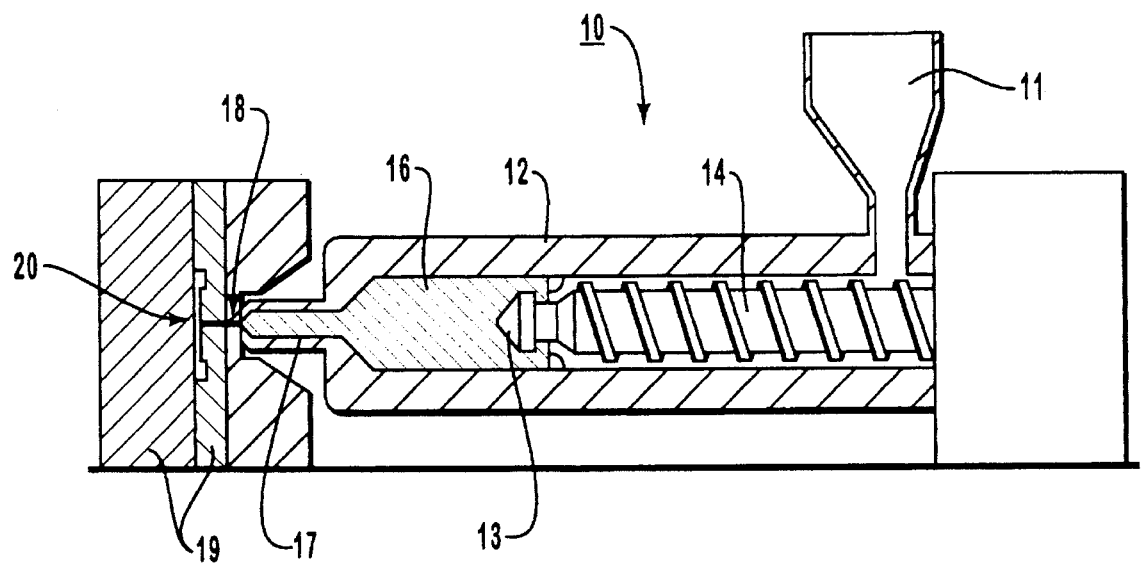
FIG. 1 is a cross-sectional view of a simple injection moulding machine.

FIG. 1 shows a sectional view of a simple injection moulding machine 10. Hopper 11, into which solid plastic material is fed, usually in pellet form, is mounted on the upwards-facing surface of the cylindrical body 12. The cylindrical body 12 forms a barrel chamber in which is contained a concentric ram 13 and screw 14. A plastic melt 16 occupies the forward extent of the chamber between the ram 13 and the machine nozzle (or barrel end adaptor) 17. The walls of body 12 are temperature controlled so as to maintain the plastic in a molten state. Heating elements to achieve the melt are not shown.

The body of the injection moulding machine is attached to a mould die structure 19, essentially comprising two sections forming the mould cavity 20. The nozzle 17 is connected to the mould cavity 20 by means of a sprue, runners and gates, all of which can be of varying and determinate dimensions. In the present example, a simple representation of such a system is shown as a single sprue/runner/gate combination 18. As with the body 12, the die structure 19 is maintained at a specified temperature by heater elements, which again are not shown.

The injection moulding process involves the steps of auguring the desired amount of plastic material into the barrel chamber using the screw 14 so as to form a melt 16. Once the melt 16 and die 19 have achieved the desired temperature, the moulding process can commence. The melt 16 and die 19 temperatures play a key role in determining the result of the injection moulded product.

Figure 2:
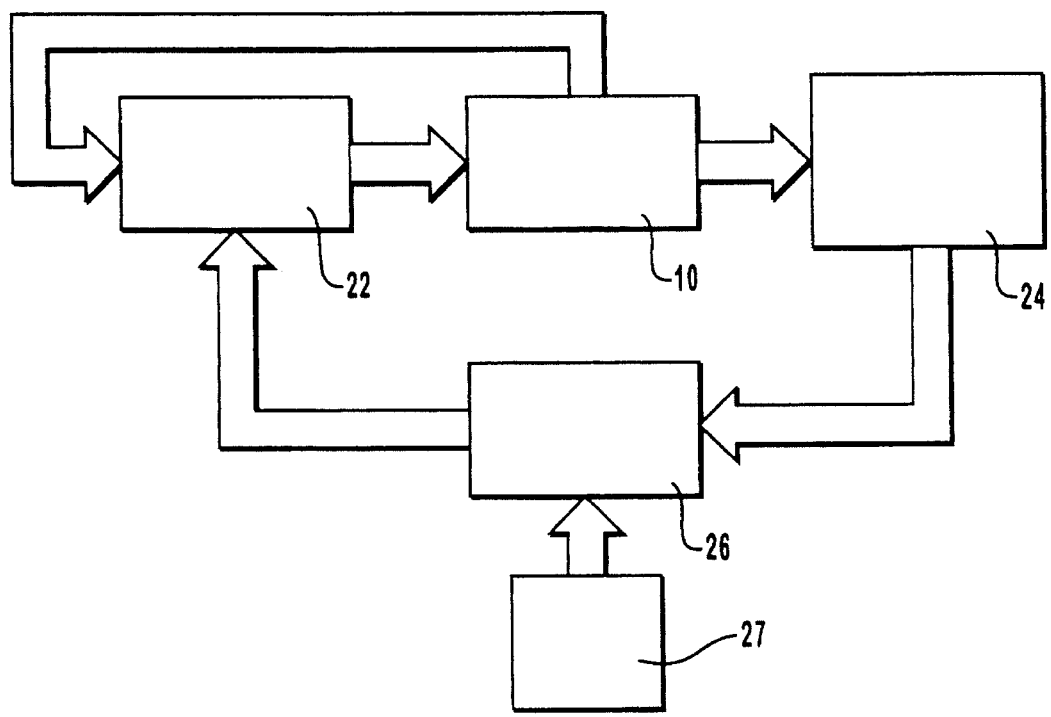
FIG. 2 is a block diagram of a system constructed in accordance with the invention.

FIG. 2 shows a block diagram which embodies an example of the invention. The injection moulding machine 10 corresponds to the like-numbered item in FIG. 1.

The injection moulding machine 10 has connected to it a processor controller 22, which outputs various control signals such as melt temperature, cavity temperature, and ram displacement. The process controller 22 also has control over the sequencing and hydraulic operations of the injection moulding machine.

The looped connection to the process controller 22 from the injection moulding machine 10 represents closed loop control over ram displacement.

Sensors 24 detect mould and melt temperatures, as well as measuring the nozzle 17 flow pressure with time by virtue of a pressure sensor (not shown) mounted thereat. This is the preferred location for the sensor since it then does not need to be changed with each new die. The sensor could be any commercially available type with the requisite frequency response and sensitivity, and typically of a piezo-electric type. It may also be preferable to provide pressure or mass flow rate sensors in the mould die structure 19 so as to form part of the wall of cavity 20.

All these sensors are connected to a data processing device 26, which could be a datalogger or some other larger microprocessor based machine. The data processing device also has an input device 27 connected to it, which provides a means by which a reference plastic flow characteristic as determined by the FLOW software is inputted, as will be described in more detail presently. Suitable embodiments of the input device 27 include optical media storage, or a floppy disk or hard disk drive usually operated in conjunction with a keyboard. Alternatively, the input device 27 could represent a networked computer system. Indeed, all the elements 22, 26 and 27 could be the one data processing means such as a personal computer.

The data processing device 26 outputs an analogue signal to process controller 22, which represents the desired ram displacement characteristic with time. Other signals are passed to the process controller 22 including temperature settings for the melt 16 and die 19.

Figure 3:
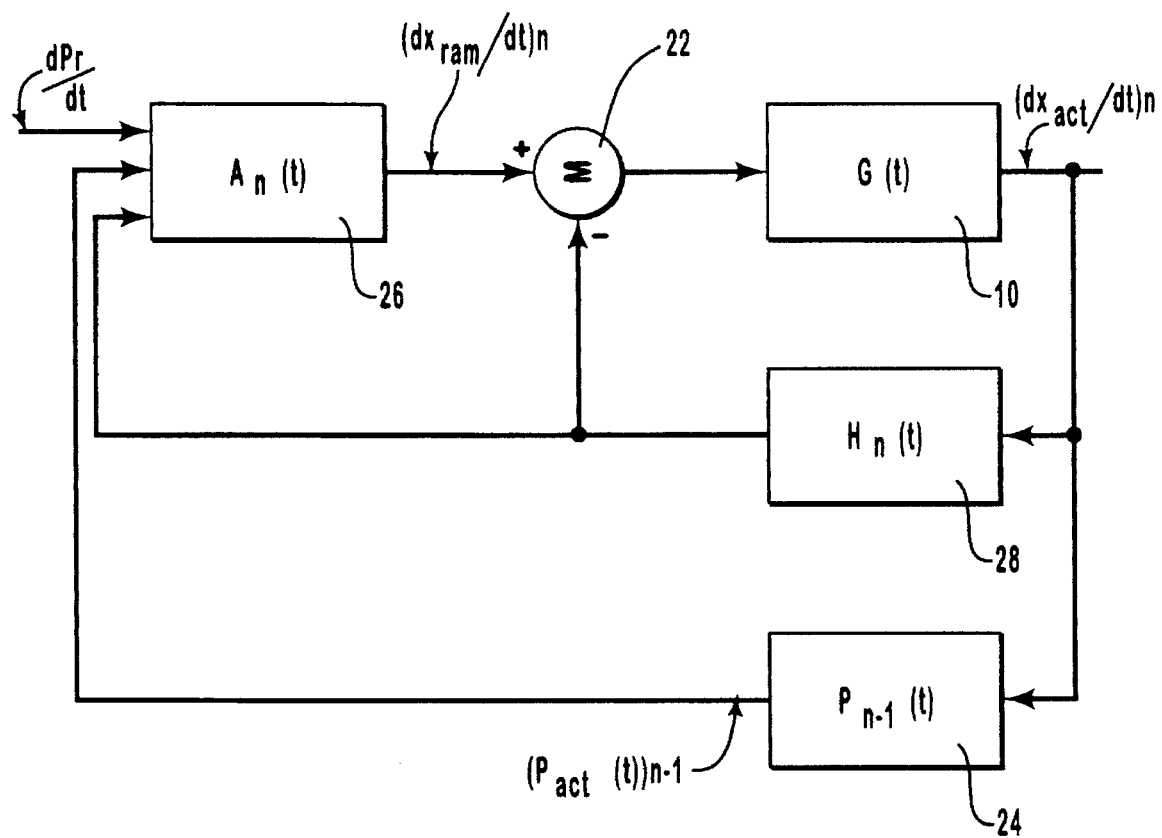
FIG. 3 is a block diagram which further illustrates the system of FIG. 2.

FIG. 3 shows the system in functional block element form. Like-numbered items have the same identity as in previous Figures.

Block $A_n(t)$ represents the data processing device 26. This and the other block elements are shown as having mathematical significance as a function of time so as to indicate the continuous nature of the method. Further, the subscript, n, indicates that there is also a discrete consideration, in that the injection moulding process takes place in shots; that is, one (or more) article is produced then the machine resets and the process is repeated. Accordingly, n can be defined as a set of integers, [n: n=0, 1, . . . ].

The summation device, $\Sigma$, represents the process controller 22. The process controller performs many more functions, however these are unimportant for the purposes of the present example.

The block $G(t)$ represents the injection moulding machine 10, while $P_{n-1}(t)$ is a pressure sensor 24 located at the nozzle 17. $H_n(t)$ represents a ram displacement sensor 28 which is not shown elsewhere.

The input $dP_r/dt$ represents the reference plastic flow characteristic of pressure as determined at the nozzle with respect to time. Although time is used as the independent variable, and is convenient when deriving a desired ram displacement characteristic with time, it would be equally acceptable to provide the input as a function of ram displacement.

The determination of the $dP_r/dt$ characteristic is made by use of the design programs developed by the applicant, and available under the trade marks MOLDFLOW/FLOW or MF/FLOW as previously discussed.

The plastic flow characteristic does not translate directly onto a ram displacement characteristic due to the compressibility and thermal contraction of the plastic as it flows from the barrel into the cavity. For example, in the early stages of injection, the ram 13 will move forward, but must travel a significant distance to compress the plastic before the plastic velocity at the flow front is commensurate with the velocity of the ram. Conversely at the end of flow, the pressure at the flow front will continue to be high after the ram has slowed or stopped because of expansion of the plastic under pressure.

Now, assuming we are describing the moulding of the first article in a production run, there is no information available from sensor 24 as n=1, and therefore $(P_{act}(t))_0 = 0$ for all t.

Data processing device 26 takes the inputted $dP_r/dt$ and derives a first ram displacement characteristic, $dx_{ram}/dt$. This is done by way of providing a first conservative estimate based on the compressibility and expansion of the plastic material (a known relation stored in the process controller 22). No particular effort is made to compensate for the system dynamics at this time, rather it is only a starting point.

A first shot is performed, and because of the first estimate, the time taken by the ram 13 at each velocity of the displacement characteristic will be longer than the optimised time as determined by the FLOW software. On subsequent shots, instants of velocity change will progressively move towards optimised points in time. Indeed, in most optimised reference characteristics there will be clearly defined velocity changeover points delineating discrete regions.

During the first, and indeed subsequent shots, the process controller 22 provides closed loop control of the ram 13 by virtue of the value of $dx_{act}/dt$ being feedback via displacement sensor 28. The value of $dx_{act}/dt$ is also provided to data processing device 26, which utilises this information to give a determination of ram displacement, which is achieved by a simple time multiplication. A common time base is determined to allow meaningful comparison of the reference characteristic with the measured characteristic. Also, pressure sensor 24 transmits information regarding the actual pressure, $P_{act}$, at the nozzle 17 to the data processing device 26 where it is converted to $dP_{act}/dt$ and stored. Alternatively, the sensor 24 could be at the type which outputs the time rate of change of pressure characteristic.

Before the second shot, that is n=2, a comparison is made between $dP_r/dt$ and $(dP_{act}/dt)_1$ to generate an error function, whereafter an adjustment is made so as to compensate the outputted value of $(dx_{ram}/dt)_2$ to achieve a closer approximation of the reference plastic flow characteristic as determined by the FLOW design procedure. This compensation takes account of errors in both the pressure and time domains.

Once the second shot is completed, the value of $(dP_{act}/dt)_2$ is compared with $dP_r/dt$, and a further compensation made to $(dx_{ram}/dt)_3$ if necessary. The comparison and compensation processes will be discussed further presently.

Figure 4:
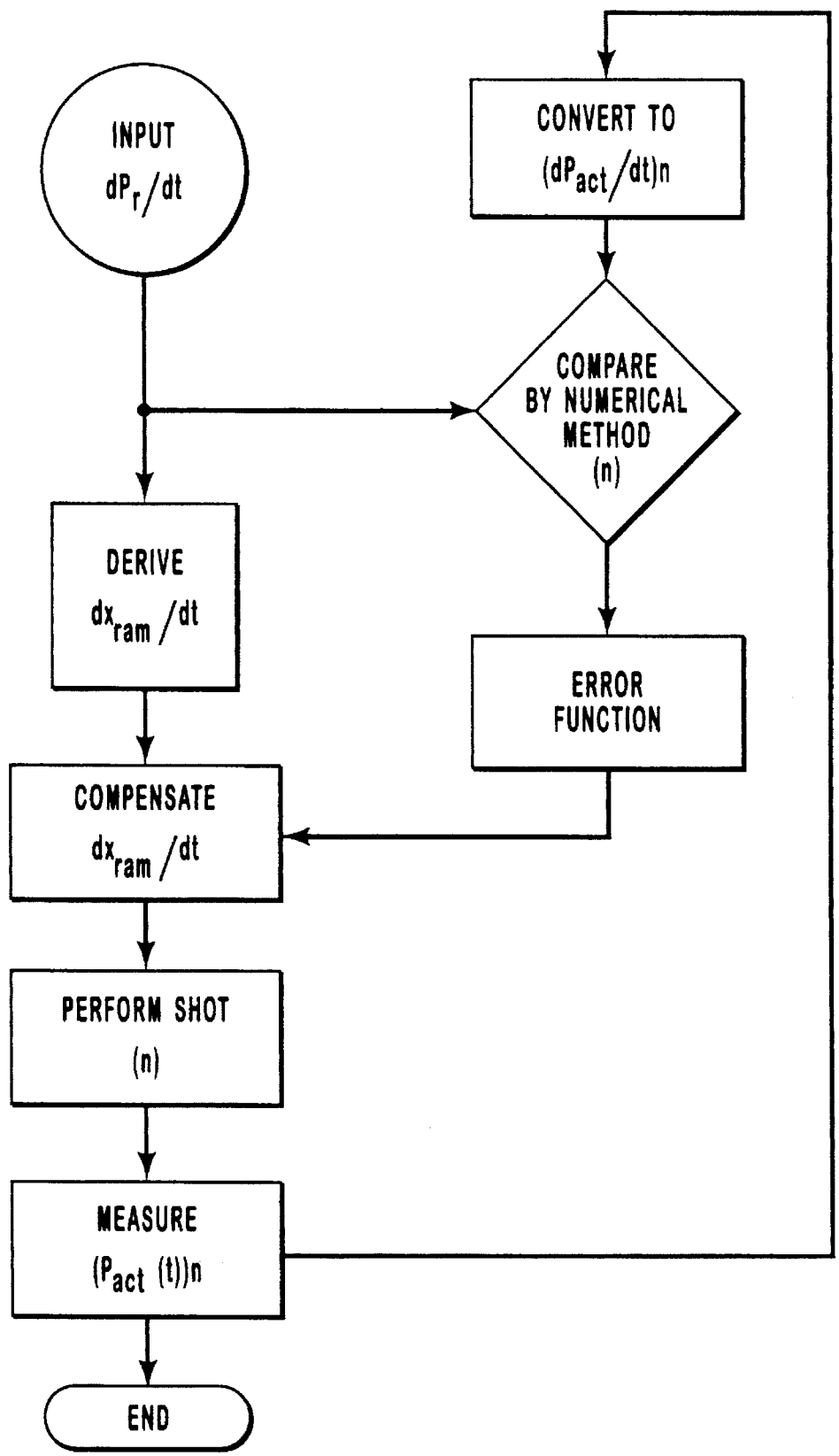
FIG. 4 is a flow diagram illustrating a first example of the method.

FIG. 4 is a block flow diagram illustrating the procedure described immediately above. By this method, the injection moulding can be continuously optimising, and achieve consistent high quality mouldings which substantially correspond with the required theoretical design specifications. Furthermore, the procedure allows the ram to move forward at the maximum speed possible throughout filling. and with minimum wasted time during necessarily slow speed sections such that the mould temperature is maintained at the maximum possible level giving faster production times and improved article quality.

Figure 5:
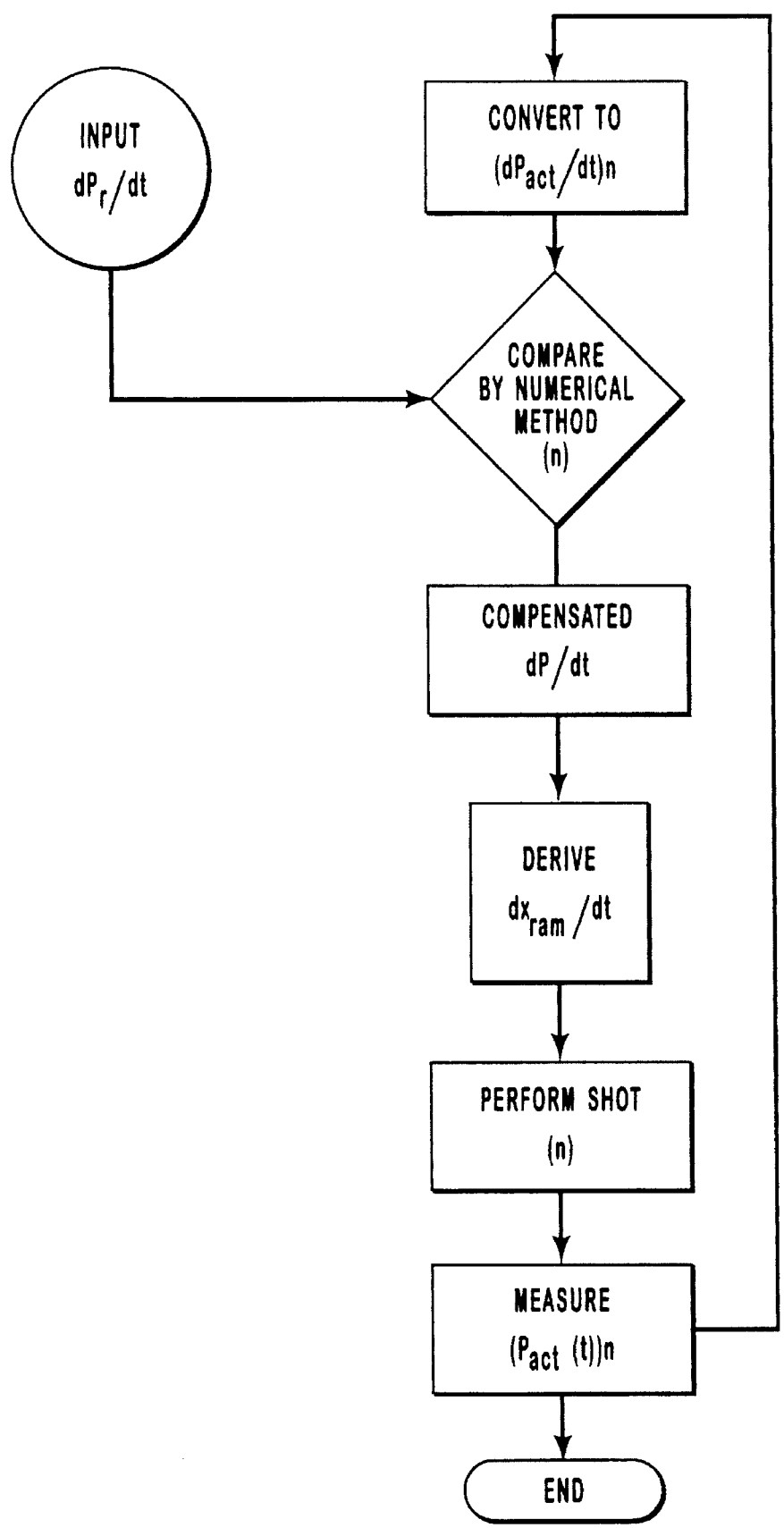
FIG. 5 is a flow diagram illustrating a further example of the method.

A variation of the method of FIG. 4 is shown in FIG. 5, which provides that a comparison is made between the reference $dP_r/dt$ characteristic and the converted actual pressure characteristic, $dP_{act}/dt$. The result of the comparison is to generate a compensated $dP/dt$ characteristic, from which the ram displacement characteristic, $dx_{ram}/dt$, is derived. The next shot is then performed, and the process repeated.

The method of FIG. 4 will now be further described with reference to FIGS. 6–11.

Figure 6:
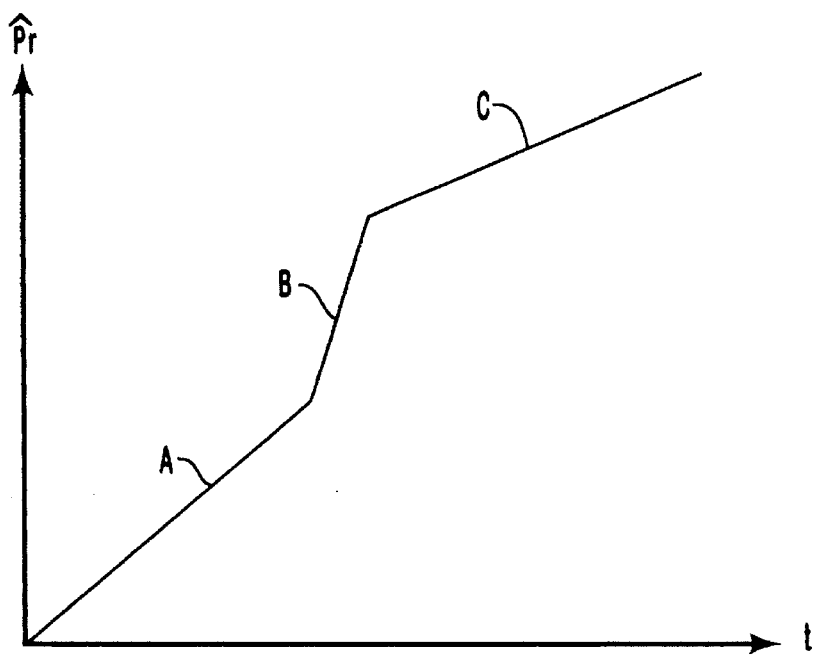
FIG. 6 is an idealised reference flow characteristic.

FIG. 6 is a graph of idealised or reference nozzle pressure, $P_n$, as a function of time and normalised with respect to mass flow rate. It is taken that the FLOW design software has determined that the characteristic described in this figure as optimal for the article being moulded. The graph contains three sections described generally as A, B and C. These sections are piecewise linear, and correspond to the variation of pressure of the plastic flow at the nozzle 17 as the plastic fills the cavity 20.

Figure 7:
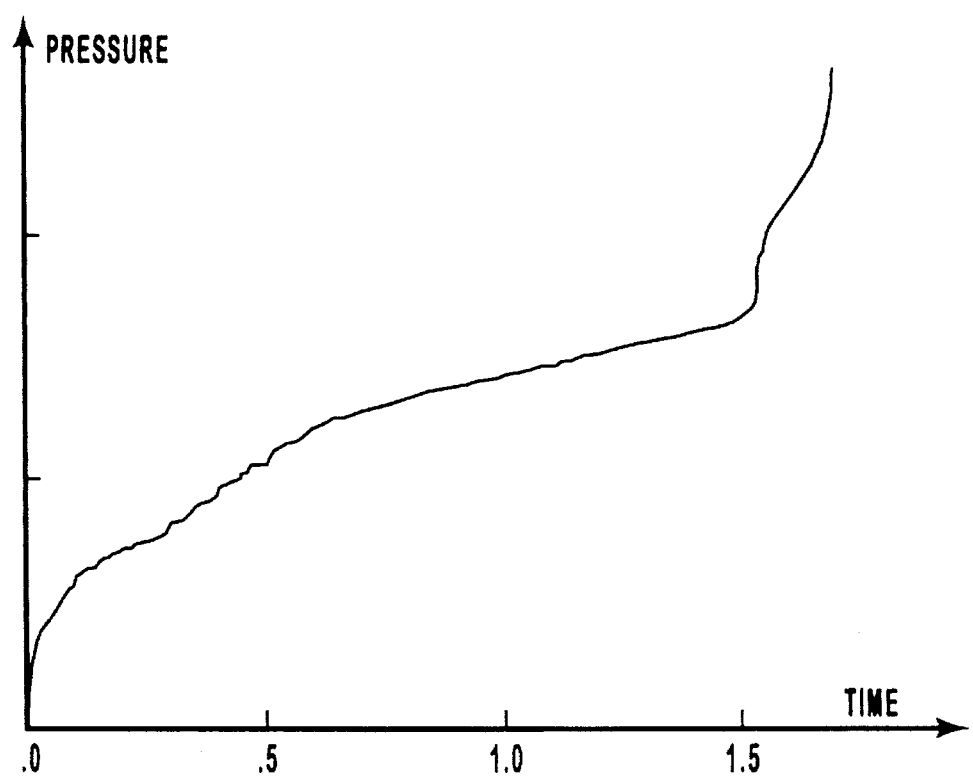
FIG. 7 shows a real reference flow characteristic determined by FLOW software.

FIG. 7 shows a typical real reference flow characteristic as determined by the FLOW software, and again three specific regions can be identified by a change in gradient, although each section does not necessarily correspond with A, B or C of FIG. 6. The example of FIG. 6 has been chosen for reasons of simplicity.

Figure 8:
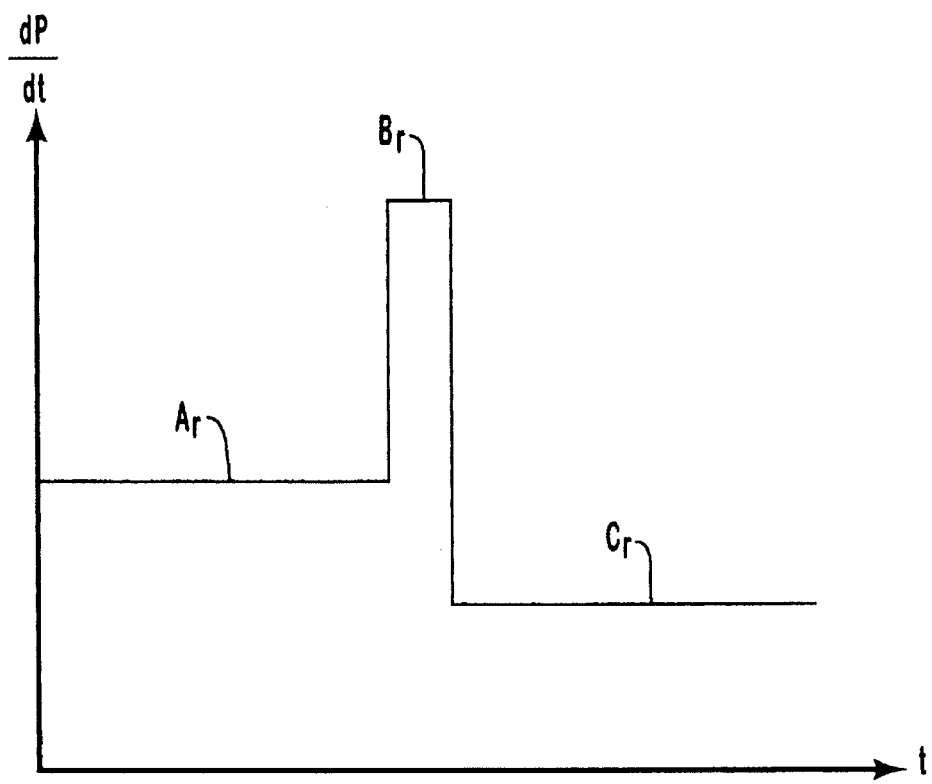
FIG. 8 is a mathematical derivation of the characteristic of FIG. 6.

FIG. 8 is a graph of the time rate of change (or time derivative) of normalised nozzle pressure, $dP_n/dt$, which is utilised in the comparison and for deriving the $dx_{ram}/dt$ characteristic. Again, the three sections are evident, and identified as $A_r$, $B_r$ and $C_r$, to distinguish this characteristic as the reference design requirement for the particular mould. The $dP/dt$ characteristic corresponds to the like-identified input shown in FIG. 3.

Figure 9:
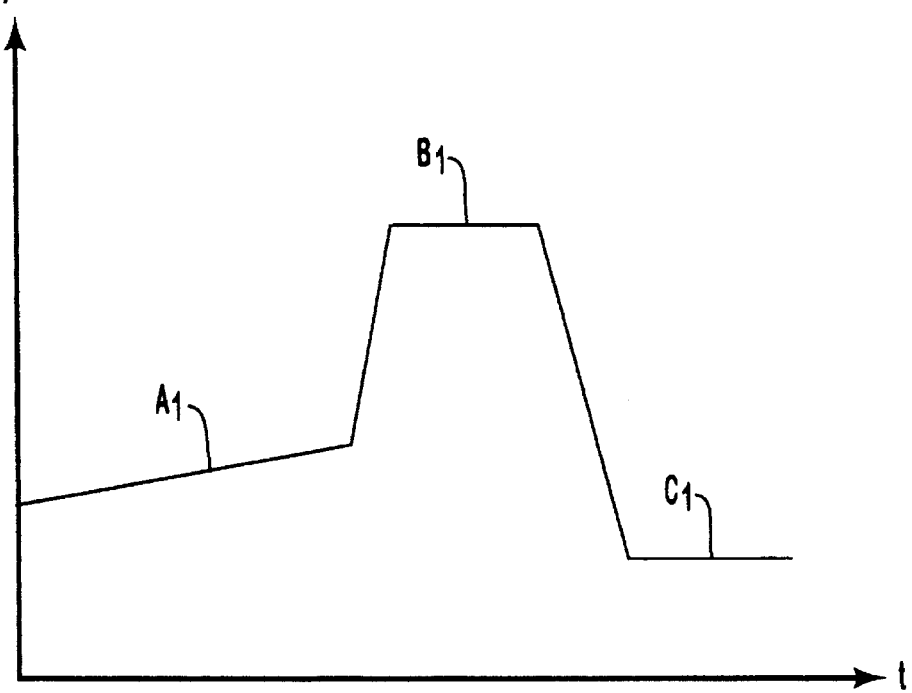
FIG. 9 shows the derived ram displacement characteristic from the reference characteristic of FIG. 6.
Figure 10:
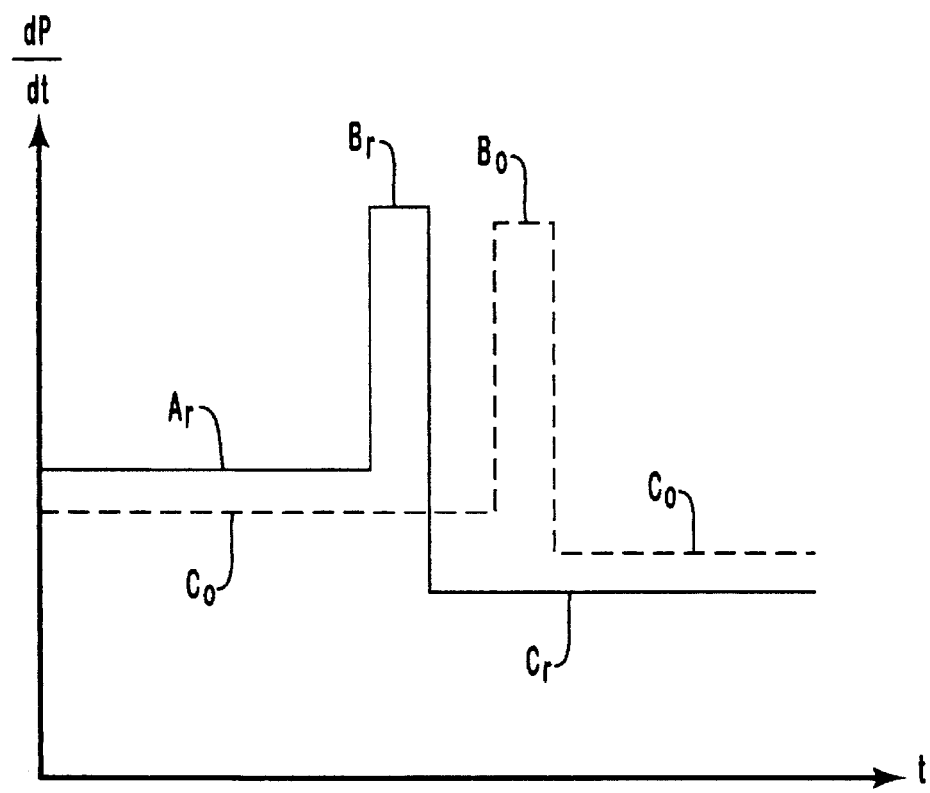
FIG. 10 is a plot exemplifying the comparison between the reference and actual characteristics.

FIG. 9 shows the derived ram displacement characteristic as determined by the data processing device 26. As previously discussed, the derivation of $dx_{ram}/dt$ is based on a conservative estimate of the system dynamics utilising a suitable mathematical transform stored in the process controller 22. Typically this involves marking the points in time of significant change in gradient of the pressure characteristic, then applying a time delay to each section on a piecewise-basis together with an appropriate curve shaping to reduce high rates of change at these key-points, as well as scaling in terms of amplitude.

The first shot is performed utilising $(dx_{ram}/dt)_1$ to produce a first moulding. During the shot, sensor 24 measures the actual plastic flow front characteristic with time to generate $(P_{act}(t))_0$, which is passed to the data processing device 26 for use in the comparison for the subsequent shot. The data processing device 26 may conduct a comparison on the basis of $P_r$ versus $P_{act}$, or $dP_r/dt$ versus $dP_{act}/dt$ as is convenient.

In reality, the system is the subject of significant electrical noise and so therefore is $dP_{act}/dt$. Therefore, in order to analyse this characteristic and perform the comparison, it is necessary to institute a degree of curve smoothing by means of a regression analysis, wherein sections of the curve or modelled by a smooth mathematical function, for example of the form $y=a+Bx+Cx^2$.

The procedure in applying the analysis is to take the complete measured $dP_{act}/dt$ curve and apply the second order regression analysis to it. This gives significant errors at various points in time. The curve is then searched to determine the point which has the maximum error. The curve is then broken into two separate curves and a further second order regression is conducted on each portion alone to again locate a point of maximum error. If this error is still significant, then that particular portion of the curve is broken again into two further sub-curves, and so on, until the original curve has been split into a number of sub-curves which give good agreement with the second order fit.

FIG. 10 again shows the reference characteristic of FIG. 8 superimposed with the measured value of $(dP_{act}/dt)_0$ for the first shot.

In order to conduct the comparison (post-curve smoothing), the following steps are taken. The measured $dP_{act}/dt$ characteristic is analysed at local areas of the curve to identify any distinct changes of gradient that occur at key points (ie., changes between sections A, B and C) which represent a change in velocity of the ram. Therefore, the actual position of the said points representing the changes in velocity are known with respect to a common time origin, and can be compared against the reference characteristic, $dP_r/dt$, thereby to obtain a measure of the response time of the system. Based on this comparison, the compensated $dx_{ram}/dt$ characteristic for the next shot can be derived. In deriving the characteristic for the next shot, a safety factor would preferably be included, such as for example a scheme whereby there is a halving of errors is pursued so as to gradually approach the optimized $dx_{ram}/dt$ characteristic over a number of shots.

The error function is determined in time with respect to each key point, and the $dx_{ram}/dt$ characteristic is compensated by, say, half the error in time, and also in velocity (or pressure), thereby contemplating a two-dimensional translation to map the key points onto one another. The segments of the curve between the key points for the $dx_{ram}/dt$ characteristic remain essentially the same as were originally derived from the reference characteristic, $dP_r/dt$.

An alternative method would be to move the whole of the actual characteristic curve by an x-y translation so that there is overlaying of the reference and actual curves such that they cross at one particular point. The difference between the curves in the localised region about that intersecting point can be taken as an error function. Any further manipulation of the actual characteristic curve can take place until the error function is minimised, in which instance the curves can be considered to be overlapping. The corresponding translations in minimising error functions are then used in deriving the compensated $dx_{ram}/dt$ characteristic for the subsequent shot.

Other well known numerical or adaptive methods could also be used in the comparison of the actual characteristic curve and the reference characteristic curve in order to approach the optimized $dx_{ram}/dt$ characteristic which takes into account the particular response of the system as a whole.

Figure 11:
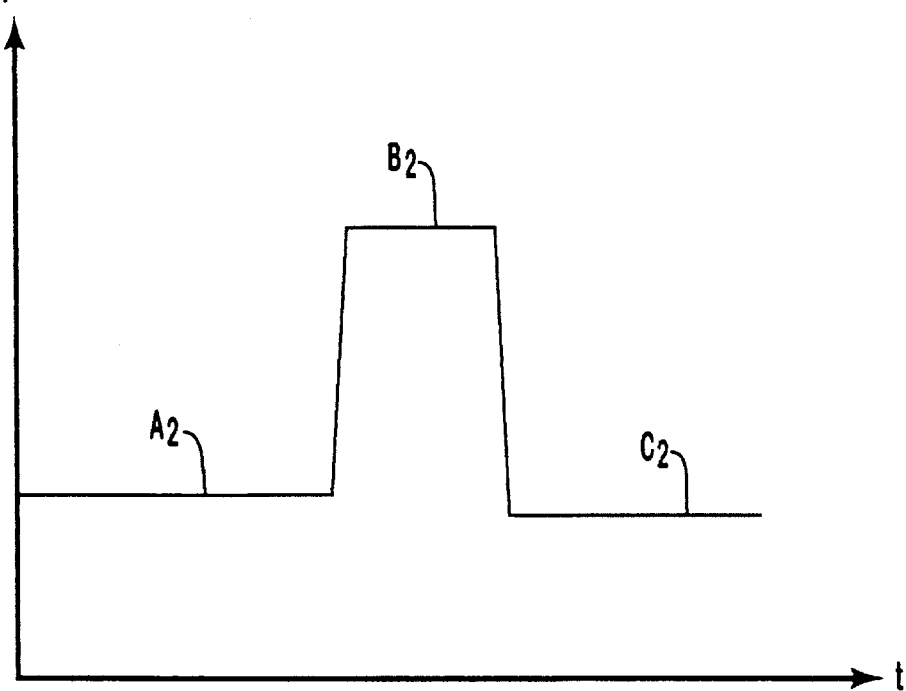
FIG. 11 shows the compensated ram characteristic.

Now that an error function has been determined, the ram displacement characteristic must be compensated for the second shot. FIG. 11 shows $(dx_{ram}/dt)_2$ characteristic. Accordingly, the procedure repeats for the second shot.

It would also be possible to accumulate actual $dP_{act}/dt$ characteristics and to conduct the comparison based on some averaging procedure, rather than the alternative of simply utilising the characteristic from the immediately proceeding shot for the purposes of the comparison.

The procedure described above corresponds with FIG. 4, but could easily be varied to accord with the steps as shown in FIG. 5.

Further advantages of the system of the present invention are that there is a lesser requirement for supervision of injection moulding machines and lesser number of article rejects, thereby saving significant manufacturing time and materials.

It will be appreciated the invention is not limited by the embodiments described, and that other modifications or variations, as would be apparent to persons skilled in the art, are to be considered within the scope of invention.

I claim:

1. A method for optimizing operation of an injection moulding machine having a ram for the production of moulded plastic articles, the machine having data processing means for providing said optimization, the method comprising the steps of:

inputting to the data processing means a reference plastic flow characteristic, including a gradient thereof, expressed as a function of time or ram displacement for the article or articles to be moulded, the reference plastic flow characteristic being on the basis of pressure or displacement of the plastic flow;

analyzing by the processor means a profile of a measured plastic flow characteristic obtained from an immediately preceding shot of the injection moulding machine to determine key changes in gradient of the profile of the measured plastic flow characteristic as compared to the profile of the gradient of the reference plastic flow characteristic, the measured plastic flow characteristic being on the basis of pressure or displacement of plastic flow expressed as a function of time or ram displacement;

comparing by the data processing means changes in the gradients between the reference plastic flow characteristic and the measured plastic flow characteristic to obtain an adjustment value;

adjusting the injection moulding machine in accordance with the adjustment value so obtained; and performing a next shot based on the adjustment value to more accurately control operation of the injection moulding machine.

2. A method for optimizing operation of an injection moulding machine for production of moulded plastic articles, the machine having a ram for forcing molten plastic material from a reservoir into a die, the method comprising the steps of:

inputting to data processing means, a reference plastic flow characteristic, including a gradient thereof, expressed as a function of time or ram displacement for the article or articles to be moulded, the reference plastic flow characteristic being on the basis of pressure or displacement of the plastic flow;

deriving by the data processing means a ram displacement characteristic from the said reference plastic flow characteristic;

performing a shot;

measuring by sensor means a measured plastic flow characteristic from one or more preceding shots;

analyzing by the data processing means a profile of the said measured plastic flow characteristic from preceding shots of the injection moulding machine to determine key changes in gradient of the profile of the measured plastic flow characteristic, the measured plastic flow characteristic being on the basis of pressure or displacement of plastic flow expressed as a function of time or ram displacement;

comparing by the data processing means the gradient between the said reference plastic flow characteristic and said measured plastic flow characteristic, to generate an error function;

deriving by the data processing means a compensated ram displacement characteristic from the error function for the next shot; and performing a next shot based on the ram displacement characteristic thereby controlling operation of the injection moulding machine.

3. A method as claimed in claim 2, wherein the step of comparing is conducted only with the said measured plastic flow characteristic of the immediately preceding shot.

4. A method for optimizing operation of an injection moulding machine for production of moulded plastic articles, the machine having a ram for forcing molten plastic material from a reservoir into a die, the method comprising the steps of:

inputting to data processing means a reference plastic flow characteristic, including a gradient thereof, expressed as a function of time or ram displacement for the article or articles to be moulded, the reference plastic flow characteristic being on the basis of pressure or displacement of the plastic flow;

analyzing by the data processing means a profile of a measured plastic flow characteristic obtained from an immediately preceding shot as measured by sensor means to determine key changes in gradient of the profile of the measured plastic flow characteristic, the measured plastic flow characteristic being on the basis of pressure or displacement of plastic flow expressed as a function of time or ram displacement, comparing by the data processing means changes in the gradients between the reference plastic flow characteristic and the measured plastic flow characteristic, to obtain an adjustment value;

generating by the data processing means a compensated plastic flow characteristic for the next shot on the basis of the comparison;

deriving by the data processing means a ram displacement characteristic from the said compensated plastic flow characteristic; and performing a next shot based on the ram displacement characteristic.

5. A method as claimed in either one of claim 1, claim 2 or claim 4, wherein the step of comparing comprises performing a numerical analysis to identify the key points corresponding to a maximum change of gradient in the said measured plastic flow characteristic which correspond to key points of the reference plastic flow characteristic and determining differences with respect to a common origin.

6. A method as claimed in claim 5, wherein the said reference plastic flow characteristic and said measured plastic flow characteristic are measures of pressure.

7. A method as claimed in claim 6, wherein all of the said characteristics are in respect of a derivative with respect to time or displacement.

8. An injection moulding machine for production of moulded plastic articles, the machine having a ram for forcing molten plastic material from a reservoir into a die and the ram being under control of a control means, the injection moulding machine further comprising:

sensor means for measuring a measured plastic flow characteristic from any one shot; and data processing means having inputted at least the said measured plastic flow characteristic and a reference plastic flow characteristic, including a gradient of the reference plastic flow characteristic, the reference plastic flow characteristic being on the basis of pressure or displacement of the plastic flow for the article or articles to be moulded and, in operation, analyzing the said measured plastic flow characteristic from the immediately preceding shot to determine key changes in gradient, comparing corresponding changes in gradient between the said reference plastic flow characteristic and the said measured plastic flow characteristic to generate an error function, the measured plastic flow characteristic being on the basis of pressure or displacement of plastic flow expressed as a function of time or ram displacement, deriving a ram displacement characteristic from the said reference plastic flow characteristic, compensating the said ram displacement characteristic by the error function to produce a compensated ram displacement characteristic for use in a subsequent shot by the control means to control operation of the injection moulding machine.

9. An injection moulding machine for production of moulded plastic articles, the machine having a ram for forcing molten plastic material from a reservoir into a die and the ram being under control of control means, the injection moulding machine further comprising:

sensor means for measuring a measured plastic flow characteristic from any one shot, the measured plastic flow characteristic being on the basis of pressure or displacement of the plastic flow; and data processing means having inputted at least the said measured plastic flow characteristic and a reference plastic flow characteristic, including a gradient of the reference plastic flow characteristic, for the article or articles to be moulded and, in operation, analyzing the said measured plastic flow characteristic from the immediately preceding shot to determine key changes in gradient, comparing the like changes in gradient between the said reference plastic flow characteristic and the said measured plastic flow characteristic to generate a compensated plastic flow characteristic, the reference plastic flow characteristic being on the basis of pressure or displacement of plastic flow expressed as a function of time or ram displacement, deriving a new ram displacement characteristic from the said compensated plastic flow characteristic and providing said new ram displacement characteristic to the control means for use in a subsequent shot to control operation of the injection moulding machine.

10. An injection moulding machine according to claim 4, claim 8 or claim 9 in which the sensor means is a pressure sensor.

* * * * *